United States Patent
Mortazavi et al.

(10) Patent No.: US 11,775,530 B2
(45) Date of Patent: Oct. 3, 2023

(54) METHOD TO IMPROVE GLOBAL QUERY PERFORMANCE IN AN EDGE NETWORK

(71) Applicants: Seyed Hossein Mortazavi, North York (CA); Moshe Gabel, Toronto (CA); Eyal de Lara, Toronto (CA); Zhenhua Hu, Toronto (CA); Chung-Man Abelard Chow, Markham (CA)

(72) Inventors: Seyed Hossein Mortazavi, North York (CA); Moshe Gabel, Toronto (CA); Eyal de Lara, Toronto (CA); Zhenhua Hu, Toronto (CA); Chung-Man Abelard Chow, Markham (CA)

(73) Assignees: Huawei Technologies Canada Co., Ltd., Kanata (CA); The Governing Council of the University of Toronto, Toronto (CA)

( * ) Notice: Subject to any disclaimer, the term of this patent is extended or adjusted under 35 U.S.C. 154(b) by 65 days.

(21) Appl. No.: 17/115,696

(22) Filed: Dec. 8, 2020

(65) Prior Publication Data
US 2022/0179868 A1 Jun. 9, 2022

(51) Int. Cl.
*G06F 16/2455* (2019.01)
*G06F 16/23* (2019.01)

(52) U.S. Cl.
CPC .... *G06F 16/24566* (2019.01); *G06F 16/2379* (2019.01); *G06F 16/24565* (2019.01)

(58) Field of Classification Search
CPC .......... G06F 16/24566; G06F 16/2379; G06F 16/24565
See application file for complete search history.

(56) References Cited

U.S. PATENT DOCUMENTS

| | | | | |
|---|---|---|---|---|
| 4,432,057 A | * | 2/1984 | Daniell | H04L 29/00 707/610 |
| 7,613,796 B2 | * | 11/2009 | Harvey | H04L 69/329 709/221 |
| 11,470,172 B1 | * | 10/2022 | Kapoor | G06F 9/455 |
| 2012/0226799 A1 | * | 9/2012 | Kapur | G06F 11/3006 709/224 |
| 2013/0024167 A1 | * | 1/2013 | Blair | G06F 17/18 703/2 |
| 2016/0012097 A1 | * | 1/2016 | Lee | G06F 16/2455 707/690 |
| 2018/0089258 A1 | * | 3/2018 | Bhattacharjee | G06F 16/24535 |
| 2018/0253463 A1 | * | 9/2018 | Bastawala | G06F 15/76 |
| 2019/0324992 A1 | * | 10/2019 | Bingham | G06F 11/301 |

(Continued)

OTHER PUBLICATIONS https://www.tutorialspoint.com/t_sql/index.htm (Year: 2016).*

*Primary Examiner* — Mark D Featherstone
*Assistant Examiner* — Kweku William Halm (57) ABSTRACT

Methods and systems for data management are described, particularly for processing global queries. Each global query includes a user-defined query constraint value, such as laxity or query response time limit. The query receiving node maintains a copy of the previously updated data from all of its children node. The query receiving node first searches for the requested query data in its local data storage to minimize children node query. If any portion of the requested data in the local data storage fails to meet the query constraint value, then the child node from which the data came from is tasked with recursively executing the global query.

25 Claims, 7 Drawing Sheets

(56) References Cited

U.S. PATENT DOCUMENTS

2019/0361848 A1* 11/2019 Weaver ............... G06F 16/2228
2020/0226183 A1    7/2020 Bitincka et al.
2021/0144517 A1*  5/2021 Guim Bernat ........ H04L 9/0637
2022/0078081 A1*  3/2022 Mahdi .................. H04L 41/042

* cited by examiner

Input: query $q$, query time $T_q$, laxity $L$, current node $n$
Output: result $R$, actual freshness time $T_f$ 1 Initialize set of accessed children $A \leftarrow \emptyset$
2 Initialize result $R$
3 foreach *child* $c \in \text{children}(n)$ do
4     if *last update time from child* $T_u(c) < T_q - L$ then
5         Add $c$ to accessed children: $A \leftarrow A \cup \{c\}$
6         Send global query $q$ to child $c$
7 $R_{loc} \leftarrow$ execute $q$ on local store on rows not from $A$
8 Update result $R$ with local results $R_{loc}$
9 Set freshness time $T_f$ to latest update time:
    $T_f \leftarrow \min_c \{T_u(c)\}$
10 foreach *response* $R_c$, $T_c$ *from child* $c$ *of node* $n$ do
11     Update result $R$ with child result $R_c$
12     $T_f \leftarrow \min(T_f, T_c)$
13 Return results $R$ and actual freshness $T_f$

FIG. 7

METHOD TO IMPROVE GLOBAL QUERY PERFORMANCE IN AN EDGE NETWORK

TECHNICAL FIELD

The present disclosure relates to electronic circuits, and in particular active isolators for radio frequency (RF) circuits.

BACKGROUND

Data (used in the singular to indicate a collection of pieces of information) is an essential part of any network system, including enterprise distributed systems where data is stored over a wide geographically distributed environment and across a hierarchy of data centers arranged as an edge network.

For example, in advanced industrial automation scenarios, an industrial complex may include many resource limited Internet-of-Things (IoT) devices that can log huge amounts of data metrics. Typically, these data metrics are locally stored to save on network bandwidth and other costs. An ad-hoc global query mechanism may be used for remote monitoring and management without incurring significant bandwidth or computation overhead. For example, in the event an equipment fault is suspected, an operator could query specific relevant metrics for that equipment for the last minute, hour, or day.

As another illustration, smart cities typically use distributed sensors to collect data used for pollution monitoring, transportation and traffic control, and healthcare for example. Theses sensor produce large amounts of valuable data and sensory information, not all of which need to be streamed in real-time for processing. Instead, data is often uploaded in batches. In such networks, some queries can be ad-hoc, in response to specific events. For example, an operator could query for the number of pedestrians and bikes in a specific area affected by a car accident.

As a further example, utility companies have been using smart meters to aggregate usage information from customers. While smart meters periodically send data to a centralized location for coarse grained analysis, on-demand querying could allow for fine-grained analysis, which in turn could enable more responsive resource management.

Data management in enterprise distributed system scenarios such as those described above have been a challenge. Particular, the challenge manifests itself when such applications are moved into Cloud, Edge and Internet-of-Things (IoT) domain where data is stored over a wide geographically distributed environment and across a hierarchy of data centers arranged as an edge network. For example, network links may have limited bandwidth, high latency variation, and can intermittently fail. In such networks, data can be updated at any node within the hierarchy of data centers. When data read and write operations are performed locally (i.e. at a local node), they need not be immediately replicated to the entire network. Therefore, a common scheme provides fast local read and write operations using a high-performance local data store, and periodically propagate the updated data upwards using a best-effort or on-demand strategies for data synchronization. This is known as eventually-consistent.

In the eventually consistent schemes mentioned above, two types of queries may be submitted: local queries and global queries. When a query is submitted to a top node of an eventually-consistent network system, since the required data is likely distributed over one or more end nodes of the network system, it may be difficult to guarantee the temporal accuracy, also referred to as freshness, and completeness of the query response.

Accordingly, enterprise distributed systems could benefit from an efficient and accurate global querying mechanism, however, in practice, strong consistency over a large geographical area may be difficult to achieve. In response, data-heavy edge computing applications are built to accommodate relaxed consistency guarantees such as eventual consistency.

One common approach is to maintain a local replica of the eventually synchronized data at each node. Thus, any query may be responded by searching through the locally stored synchronized data. This may permit a quick response time, but the data may be stale as updates are not immediately propagated to all replicas, but are instead propagated periodically or on-demand. Similarly, edge computing applications often rely on distributed tabular or key-value stores, rather than classic relational databases. Joining tables and transaction support can be prohibitively expensive in distributed settings, particularly when the volume of data is large. While relational and transactional databases in geo-distributed settings is an active area of research, many current high-performance distributed databases are tabular or key-value stores.

Alternatively, an exhaustive search through the entire system network may be conducted to locate the freshest data required for the query response. However, this approach is time consuming and resource intensive. Another alternative is stream processing where queries are decomposed to graphs of operators, and are distributed across the entire system network. Data can be processed and aggregated as it is streamed from the edge nodes (or end nodes) towards the top node. However, this approach increases implementation complexity as it requires deploying, coordinating, and executing operators across various nodes. Moreover, distributed streaming processing across a geo-distributed network system may be difficult due to unreliable links, frequent reconfigurations, and high latency. Stream processing therefore incurs high setup and ongoing costs, and is therefore better suited for processing small set of recurrent or continuous queries that are known in advance as opposed to ad-hoc queries that require data exploration.

Accordingly, there is a need for an improved data management system capable of handling local and global queries in an efficient and timely manner while assuring data freshness.

SUMMARY OF THE INVENTION

In one aspect, the present disclosure provides a hybrid approach for efficient on-demand global queries satisfying a user-defined freshness constraint by exploiting the underlying hierarchical structure of edge networks.

In another aspect, the present disclosure provides an eventually-consistent tabular data management system for edge-computing applications that may allow users to intelligently control the trade-off between one or more of query constraints and one or more quantitative attributes of the query response. By way of a non-limiting example, users may specify a precise freshness constraint for each individual query, or alternatively the user may specify a deadline for the query response, as a query constraint. The query may then be executed over a subset of the network, using local replicas in intermediate network nodes as caches to avoid querying edge nodes. The result set may include, in the absence of failures, all data that satisfy the specified query constraint as the cost of a query response attribute, such as latency or resource usage.

In a further aspect, the actual data attribute associated with the query constraint may be provided so as to permit the user to discern the exact data attribute value. For example, if the query constraint is in the form of a freshness value, the actual freshness of the data in the form of a time stamp may be provided in the query response so the user may discern the exact time that the data was generated.

In a further still aspect, the present disclosure provides a data management system that permits partial responses to a query in the event of, for example, intermittent link errors, or other types of network failures that may be encountered. The users may be notified of how much of data was missing from the partial response.

In another aspect, the present disclosure provides a method of data management in a hierarchical edge network, the method comprising: receiving a query for a query data at a query receiving node having a plurality of children nodes, the query includes a query constraint value; searching, in a local data storage of the query receiving node, for data based on the query constraint value; updating a search result with data satisfying the query constraint value found in the local data storage; when at least a portion of the data satisfying the query constraint value is unavailable in the local data storage of the node receiving the query, recursively executing the query on the one or more of the plurality of children nodes to locate data satisfying the query constraint value; updating the search result based on the data satisfying the query constraint value as received from the one or more children nodes; and reporting the search result as the query data in response to the query.

In a further still aspect, the present disclosure provides a computing system for data management, the computing system including a processing device; and a memory storing instructions which, when executed by the processor device, cause the computing system to: receive a query for a query data at a query receiving node having a plurality of children nodes, the query includes a query constraint value; search, in a local data storage of the node receiving the query, for data based on the query constraint value; update the query data with data satisfying the query constraint value found in the local data storage; when at least a portion of the data satisfying the query constraint value is unavailable in the local data storage of the node receiving the query, recursively execute the query on the one or more of the plurality of children nodes; update the query data with the data satisfying the query constraint value as received from the one or more children nodes; and report the query data as response to the query.

In any of the above aspects, the query constraint value may be laxity L to define a freshness threshold as Tq−L, where Tq is a time when the query received.

In any of the above aspects, the data satisfying the query constraint value may be received from the one or more children nodes in batches.

In any of the above aspects, the updating further may include an actual freshness value associated with the data received from the one or more children nodes.

In any of the above aspects, the actual freshness value may be a minimum between a latest update time for the query receiving node and the actual freshness value returned by the one or more children nodes.

Any of the above aspects may further comprise comparing the actual freshness value of data from each of the plurality of children nodes to a freshness threshold to determine the one or more children nodes that needs to execute the query.

Any of the above aspects, when a link error causing a child node of the plurality of children node to be unreachable, may further comprise: updating the search result with a data from the unreachable child node from the local data storage.

Any of the above aspects, when a link error causing a child node of the plurality of children node to be unreachable, may further comprise: updating the search result with a partial data that satisfies the query constraint value; and updating the query data to include the unreachable child node.

Any of the above aspects, when a link error causing a child node of the plurality of children node to be unreachable, may further comprise estimating a number of missing data; and updating the query data to include the missing data estimate.

In any of the above aspects, the estimating may include calculating the number of missing data as:

$$p(c) = \frac{\sum_{i=0}^{k-1} R_i(c)}{T_0(c) - T_k(c)}.$$

In any of the above aspects, the estimating may include calculating the number of missing data using time series predication.

Any of the above aspects may further comprise receiving updated data from each of the plurality of children nodes; marking the received updated data with an status indicator having a first status value; and maintaining, in the local data storage, a copy of data received from each of the plurality of children nodes.

Any of the above aspects may further comprise updating the data marked with the first status value to a parent node; and changing the status indicator of the data to a second status value.

In any of the above aspects, the updated data may be received from each of the plurality of children nodes periodically.

In any of the above aspects, the updated data may be received from each of the plurality of children nodes upon request.

In any of the above aspects, the query constraint value may be a query response time limit.

In any of the above aspects, the reporting step may be completed before the query response time limit.

Any of the above aspects, when a child node fails to respond before the query response time limit, may further comprise updating the query data with a data from the unreachable child node from the local data storage.

Any of the above aspects may further comprise modifying, by the one or more children nodes, the query response limit at each hierarchical level to account for latency and processing time of the one or more children nodes.

In any of the above aspects, the one or more children nodes may execute the query in parallel.

In any of the above aspects, the query may be an aggregate query for determining a data information, and the updating query data further comprises: determining the data information based on the data satisfying the query constraint value; and updating the query data with the data information.

In any of the above aspects, the aggregate query may include a condition clause, the determining may further include applying the condition clause to the data satisfying the constraint value to determine an intermediate data; and determining the data information from the intermediate data.

In any of the above aspects, the data information may include maximum (MAX), minimum (MIN), average (AVG), total number of data (COUNT), total sum (SUM).

In any of the above aspects, the condition clause may include WHERE, GROUP BY, ORDER, LIMIT, and DISTINCT.

At least some of the above aspects may advantageously provide an active isolator for wideband performance that exhibits improved linearity and capable of operating at lower power supply with less loss.

BRIEF DESCRIPTION OF THE DRAWINGS

Similar reference numerals may have been used in different figures to denote similar components.

DESCRIPTION OF EXAMPLE EMBODIMENTS

As used herein, the term "edge networks" refers to a hierarchical network where each node may be a datacenter in which part of an edge computing application is potentially deployed. In some embodiments, the top or top node of an edge network is a server, such as a cloud server with high-performance computational and storage resources that may be well suited for scalability. As the network hierarchy is traversed downwards, data centers acting as intermediary nodes may become increasingly resource constrained, while being closer to end users and data generating devices, such as sensors, that are the source of data. At the very edge of the network are edge nodes which may be small datacenters, often comprised of a limited number of computationally-limited machines.

As used herein, the term "edge computing application" refer to applications deployed over edge networks that may divide computations and storage tasks between nodes of the network.

In the present disclosure, datacenters on the path from the top node (i.e. a cloud datacenter) to an edge node are referred to as core nodes. Users and data generating devices such as sensors are not considered as part of the network itself.

As used here, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

Figure 1:
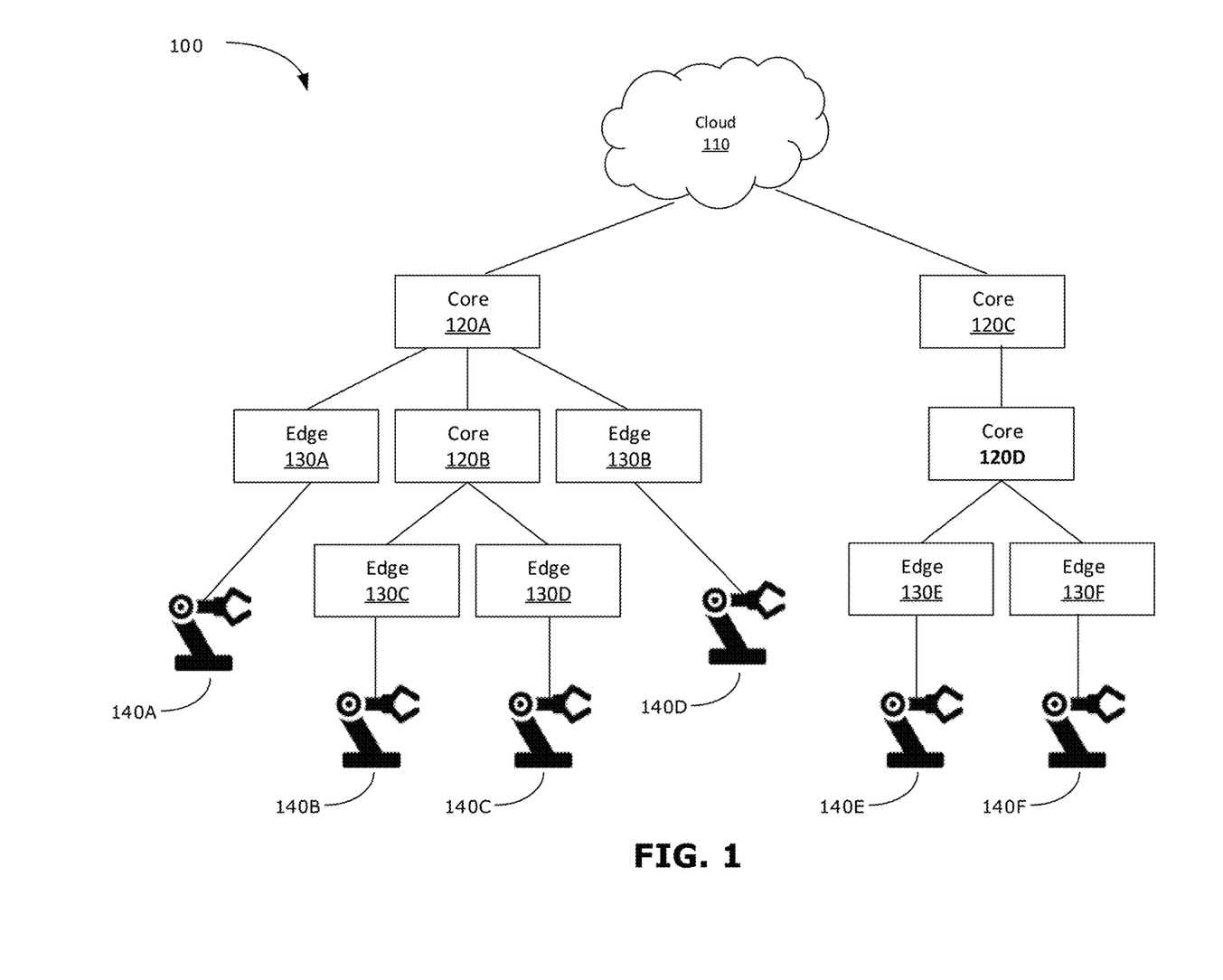
FIG. 1 illustrates an example edge network in accordance with the present disclosure having three hierarchal levels.

FIG. 1 shows a simple example of an edge network 100 having three hierarchical levels (represented as three rows of rectangular boxes below top node 110) that may be used to implement examples described herein. It is to be understood that although three hierarchical levels are shown, edge networks suitable for implement examples of described herein may have any number of hierarchical levels. The disclosed edge network 100 includes a top node 110, core nodes 120A-D (collectively referred to as core nodes 120), edge nodes 130A-F (collectively referred to as edge nodes 130), and data generating devices 140A-140F (collectively referred to as data generating devices 140).

Data generating devices 140 may be any IoT devices coupled to the network 100 configured to generate data that may be utilized for monitoring and control. Data generating devices 140 may have limited computing resources such as a single sensor or embedded systems build for a specific purpose. For example, in an Industrial IoT (IIoT) setting, the data generating devices 140 may be machinery on factory floors capable of generating a large volume of data, and the data is typically used for low-latency process control decision on the production line. In further embodiments such as a smart city, data generating devices 140 may be traffic sensors, lights, meters that generate data to assist in city management operations.

Data generated by one or more data generating devices 140 may then be aggregated at one or more edge nodes. In some embodiments, edge nodes 130 are devices capable of routing network traffic. Such devices 140 usually possess higher computing power and resources than those of data generation device 140. For example, edge nodes 130 may be base stations, routers or switches, gateways, or small-scale datacenters. In some embodiments, edge nodes 130 may be configured to monitor and control the machineries of a factory or a group of factories where more resource intensive predictive maintenance models can be applied with less stringent latency requirements. In some embodiments, the edge nodes 130 may provide fast read and write operations to a high-performance local data storage.

Intermediate nodes located between the top node 110 and the edge nodes 130 are also referred to as core nodes 120. Core nodes 120 may be data centers that aggregate data from a subset of edge nodes 130. As shown, data generated from data generating devices 140B and 140C are collected by edge nodes 130C and 130D, and are then aggregated by core node 120B. By way of non-limiting examples, a core node may be a control server tasked with controlling and monitoring factories in a region or smart cities within a state or province. As shown there may be multiple hierarchical levels of core nodes. For example, core node 120B is a child node (also referred to a descendant) of core node 120A and core node 120D is a child node of core node 120C. Despite showing at most two levels of core nodes, it is to be understood that any number of hierarchical levels of core nodes may be implemented within network 100.

The top node 110 may be a cloud server/datacenter as shown, or any other server-based system, as the top node of the network. Further, although a single instance of the top node is shown, other embodiments may have two or more top nodes. Top node 110 may consolidate data generated by the data generation device 140 coupled to the edge network 100 and provide an access point for human operators to monitor status and guiding operational decisions. In some embodiments, the top node 110 may be a cloud datacenter that possesses high-performance computational and storage resources that are suited for scalability. The top node 110 may include a backend management system capable of providing a web-based dashboard or user interface (UI) showing one or more operational characteristics of the data generation device coupled to the edge network 100 or the network itself, such as global operational status, inventory, and schedule. The top node 110 can also be used for training machine learning on historical data, since more resources are available in the cloud.

Figure 2:
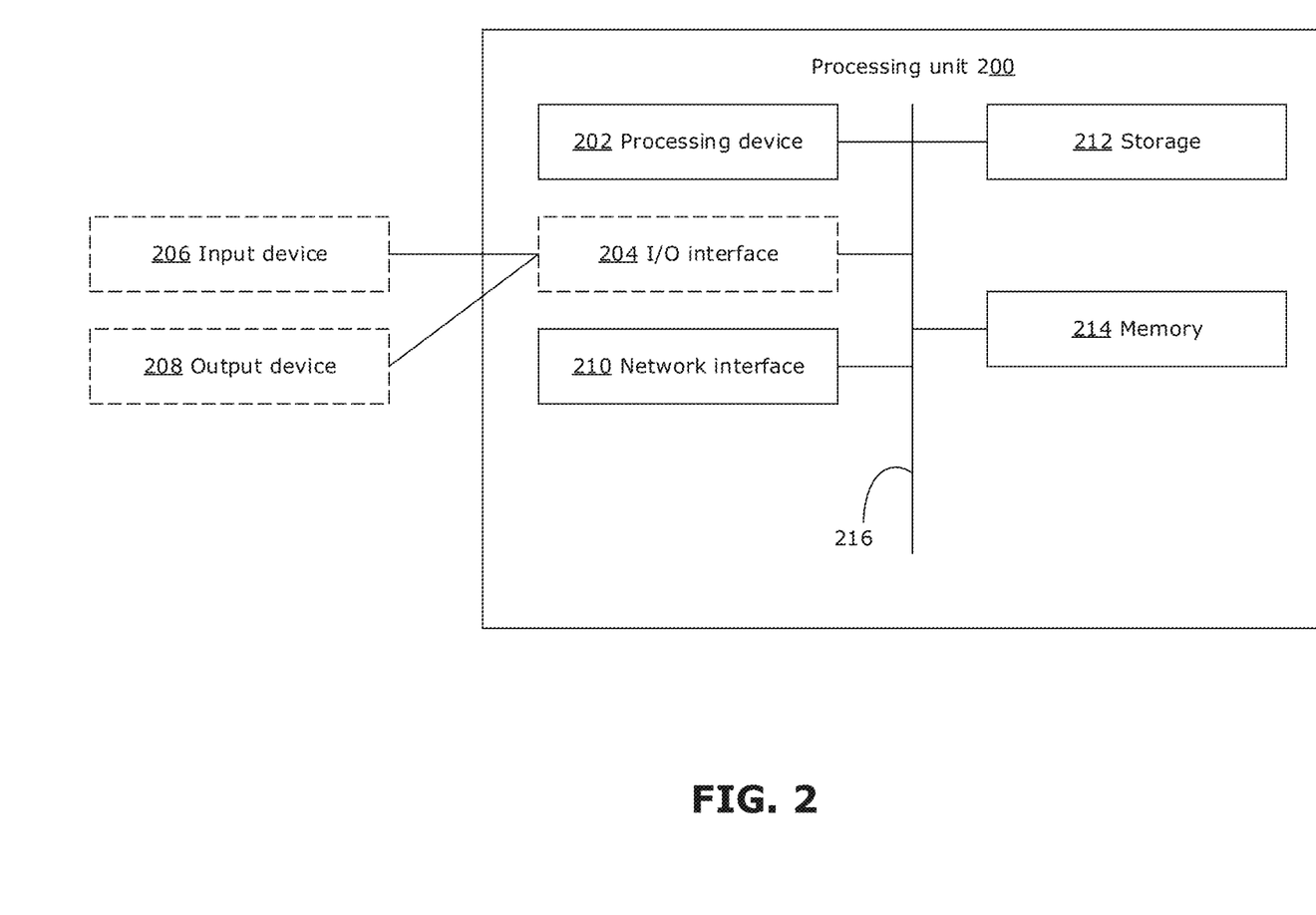
FIG. 2 illustrates a block diagram of an example simplified computing system, which may be used to implement one or more of the network nodes shown in FIG. 1.

FIG. 2 illustrates a block diagram of an example simplified computing system 200, which may be used to implement one or more of the network nodes shown in FIG. 1, such as top node 110, core nodes 120A, 120B, 122A, and 122B, edge nodes 130A-D and 132A-B. Other computing system suitable for implementing embodiments described in the present disclosure may be used, which may include components different from those discussed below. In some examples, the computing system may be implemented across more than one physical hardware unit, such as in a parallel computing, distributed computing, virtual server, or cloud computing configuration. Although FIG. 2 shows a single instance of each component, there may be multiple instances of each component in the computing system 200.

The computing system 200 may include one or more processing device(s) 202, such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing system 200 may also include one or more optional input/output (I/O) interfaces 204, which may enable interfacing with one or more optional input devices 206 and/or optional output devices 208. In the example shown, the input device(s) 206 (e.g., a keyboard, a mouse, a microphone, a touchscreen, and/or a keypad) and output device(s) 208 (e.g., a display, a speaker and/or a printer) are shown as optional and external to the computing system 200. In other examples, one or more of the input device(s) 206 and/or the output device(s) 208 may be included as a component of the computing system 200. In other examples, there may not be any input device(s) 206 and output device(s) 208, in which case the I/O interface(s) 204 may not be needed.

The computing system 200 may include one or more network interfaces 210 for wired or wireless communication with data generating devices 140 or other nodes within network 100. The network interfaces 210 may include wired links (e.g., Ethernet cable) and/or wireless links (e.g., one or more antennas) for intra-network and/or inter-network communications.

The computing system 200 may also include one or more local storage units 212, which may include a mass storage unit such as a solid state drive, a hard disk drive, a magnetic disk drive and/or an optical disk drive. In some embodiments, the local data storage units 212 may store data from the data generating devices 140 aggregated through edge nodes (i.e. 130A-D, 132A-B) and core nodes (i.e. 120A-B, 122A-B). The computing system 200 may include one or more memories 214, which may include a volatile or non-volatile memory (e.g., a flash memory, a random access memory (RAM), and/or a read-only memory (ROM)). The non-transitory memory(ies) 214 may store instructions for execution by the processing device(s) 202, such as to carry out examples described in the present disclosure. The memory(ies) 212 may include other software instructions, such as for implementing an operating system and other applications/functions. In some examples, memory 212 may include software instructions for execution by the processing device 202 to train a neural network and/or to implement a trained neural network, as disclosed herein.

In some other examples, one or more data sets and/or modules may be provided by an external memory (e.g., an external drive in wired or wireless communication with the computing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus (or buses) 216 providing communication among components of the computing system 200, including the processing device(s) 202, optional I/O interface(s) 204, network interface(s) 210, local data storage unit(s) 212 and/or memory(ies) 214. The bus 216 may be any suitable bus architecture including, for example, a memory bus, a peripheral bus or a video bus.

In some embodiments, the network 100 may provide two types of queries, local query and global query. Both types of queries may access data written locally to each of the network nodes 110, 120, and 130, but differ in the data attribute. Specifically, local queries typically provides fast read and write operations executed directly onto a local data storage units 212. Local queries may be performed by applications, or they may be supported by edge-centric eventually consistent distributed databases. Global queries may include on-demand read queries that provide user-specified query constraint (i.e. freshness or response time) guarantees. In some embodiments, when executed on a node (i.e. 110, 120, 130), the query response is computed from recent local and descendant data, up to a user-specified constraint value. By maintaining update times for data stored at the core nodes 120, network 100 may avoid querying remote edge nodes 130, allowing for faster response and conserving network bandwidth.

Figure 3:
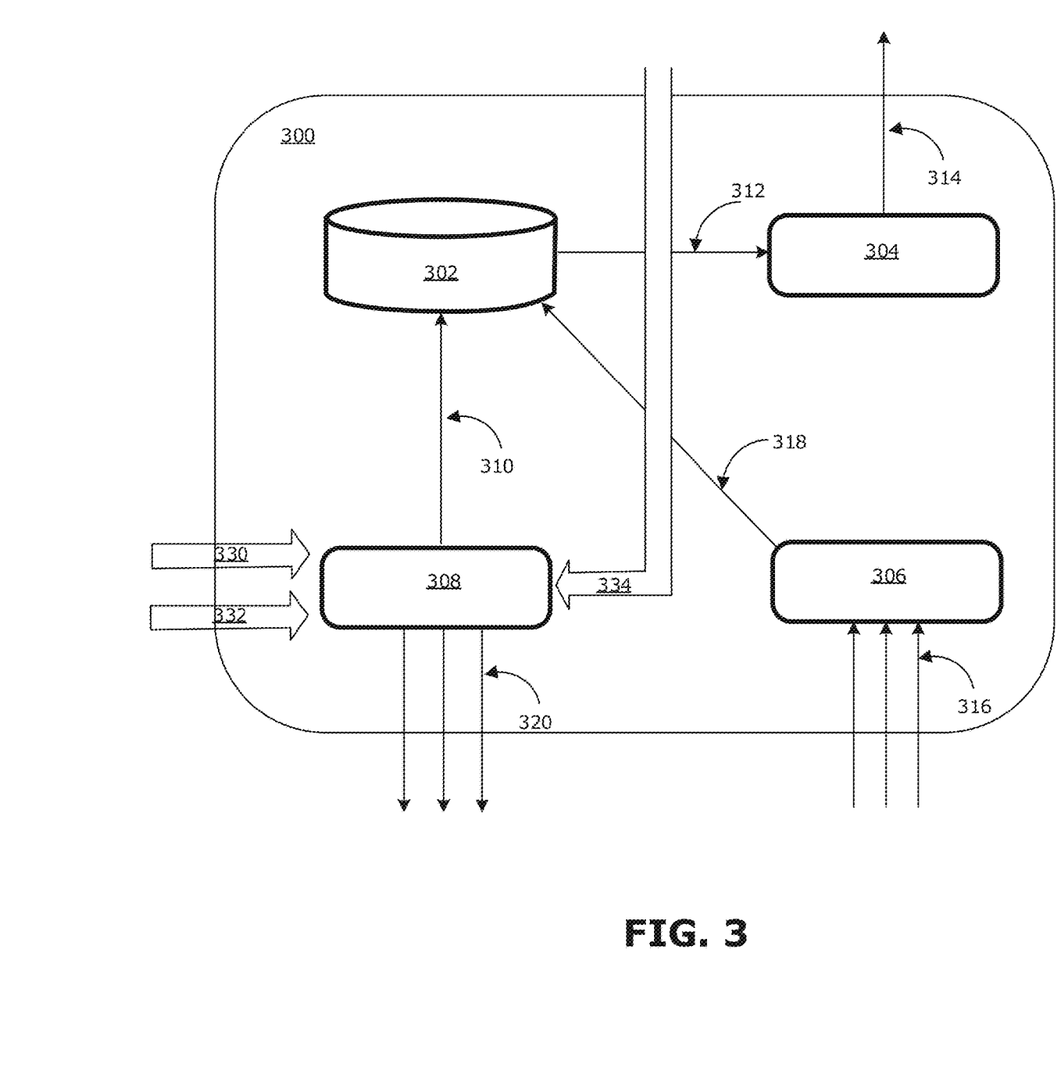
FIG. 3 illustrates is an example schematic block diagram of a network module which may be implemented at any of the top nodes 110 and core nodes 120 in FIG. 1.

FIG. 3 illustrates is a simple schematic block diagram of a network module 300 which may be implemented at any of the top nodes 110 and core nodes 120. In the illustrated embodiment, the network module 300 includes persistent local data storage module 302, data transmitting module 304, data receiving module 306, and query processing module 308.

As used here, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, an application specific integrated circuit (ASIC), field programmable gate array (FPGA), or a system on a chip (SoC) or another hardware processing circuit.

The persistent local data storage module 302, also referred to as data storage 302, is configured to provide persistent storage for local data and/or replicated data. In some embodiments, persistent local data storage 302 may be configured to store data as well as any metadata associated with the data, such as timestamps. A data storage may be said to be persistent if the data storage device retains data even after power to the device is removed. Persistent data storage may also refer to nonvolatile and non-transient storage devices.

The data storage 302 is configured to store and maintain a local copy of the remotely generated or remotely located data, such as those generated by data generation devices 140A-F. The data storage 302 in this manner may also be referred to as a materialized view, or a snapshot, which is a table segment or a database subject that contains the results of a query and whose contents are periodically refreshed based on a query, either against a local or remote table. The data storage 302 may receive a search request 310 from the query processing module 308 to locate a query data requested by a query (both local query 330 or global queries 332 and 334). The search request 310 may include any query constraint value specified in the query. The data storage 302 is searched for any data that satisfies the specified query constraint value. When data satisfying the query constraint value is found within data storage 302, the data is added to a search result. Alternatively, if no data satisfying the query constraint value is found, the search result may be left as null or any other suitable indicators to denote data not found. Destination for the search results may be dependent on the source of the query. For example, search results for a search request 310 that was generated in response to a local query 330 or a global query 332 received at the current network module 300 may be returned to the query processing module 308. Alternatively, search results may be sent via data retrieval 312 to the data transmitting module 304 when the corresponding search request 310 was generated in response to a global query 334 received from a parent node.

In some embodiments, data storage 302 may be implemented on Apache Cassandra using an independent single-datacenter Cassandra cluster, which allows horizontal scaling within a datacenter by adding nodes to the local cluster. Further, Cassandra QUORUM reads and writes may be configured to provide strong consistency within the data storage 302. It is to be understood that network 100 is independent of the underlying data storage, and may be adapted to other systems. Since the data storage 302 in each network module 300 is independent of other instances of network modules 300, network 100 may permit horizontal scalability within a node. Data may be written to the data storage 302 via data updates 314 from the data receiving module 306 as discussed in more detail below. (As used herein, an "update" to data may include modifying the data, supplanting the data, resetting the data, and any other way to record or obtain a newer version of the data of interest; an "update" to a search result, discussed below, likewise may include any way to record or obtain a newer version.)

The data transmitting module 304 is configured for transmitting data to another node in the network 100. In some embodiments, the data transmission module 304 is configured to transmit search results 310 from data storage 302 as an upstream data transmission (also referred to as an upload or push) 314 to a parent node in response to a global query 334. In some embodiments, the data transmitting module 304 is a background process configured to be executed continuously for the purposes of processing periodic (either at regular intervals or from time to time) service requests, and is often referred to as a "push daemon". When a global query 334 is received from a parent node, the query processing module 308 sends a search request 310 to the data storage 302 to locate the query data requested by the global query. The search results, whether the query data is found or not, are transmitted, as a data retrieval 312 to the data transmission module 304. The search results are then transmitted to the parent node from which the global query 334 was received as an upstream data transmission (also referred to as an upload or push) 314, which is received by the data receiving module 306 of the parent node as a received data 316. In some embodiments, the upstream data transmission 314 may contain a query ID field indicating to which global query 334 it is responding. In some embodiments, in order to avoid saturating links or overwhelming the parent node, an upstream transmission 314 that is too large in size may be truncated and transmitted (or pushed) in a plurality of upstream transmissions 314 (also referred to as batches). In some embodiments, the batches may be transmitted in temporal order (i.e. oldest to newest or vice versa) by sorting the batches via timestamp of the data contained therewithin. The update period and/or batch size may be configured to control the trade-off between data freshness and resource usage (i.e. link bandwidth, CPU, and data storage space). In some embodiments, the data transmitting module 304, upon receiving an acknowledgement from the parent node of the successful transmission of a data, may notify the data storage 302 to modify the status indicator associated with the transmitted data. For example, a "dirty" data, after having been pushed to the parent node, may be marked as a "clean" data to indicate that it has been synchronized with the parent node.

In some embodiments, data pushed from a child to a parent also contains one or more metadata fields associated with the data itself. For example, the metadata may include a timestamp indicating the update time (i.e. the time at which the data was received) and thereby describing the freshness of the data being pushed. In some embodiments, the update time is defined recursively. By way of a non-limiting example, for a network module 300 on a non-edge node (i.e. top node 110 or core node 120), the update time may be set to the minimum of the latest update times of all its children. For an edge node 130, the update time may be set to the current timestamp if the push includes all "dirty" data, or the update timestamp of the latest row of data pushed up to the parent if the data was transmitted or pushed in batches. In some embodiments, timestamp containing update time may be used by the parent node to guarantee freshness. In some embodiments, when the query data to be pushed to the parent node contains no "dirty" data, the child node responsible for transmission may transmit empty upstream transmissions 314 to its parent node with the update time as defined above. This may avoid spurious child queries in the querying mechanism.

The data receiving module 306 is configured for receiving data transmitted from one or more children. In some embodiments, one or more upstream transmissions 314 from the data transmission module 304 of one or more children nodes are received by the data receiving module 306 as received data 316. The received data 316 may comprised of multiple (i.e. three as shown in FIG. 3) upstream transmission 314 from one or more children nodes. The data receiving module 306 may be configured to be executed continuously in the background, which is often referred to as a "receive daemon".

Upon receipt of data 316, the data receiving module 306 forwards the received data 316 onto the local data storage 302 of the node as data update 318 to be stored. In some embodiments, the received data 316 is stored along with a status indicator to denote whether the data has been synchronized within the network 100. For example, a newly received data 316 may be stored with a status indicator "dirty" until it is transmitted, or pushed, upstream by data transmission module 304 to its parent node, upon which the status indictor may be changed to "clean". The received data 316 may also be stored to the data storage 306 with a corresponding metadata field, such as a timestamp indicating the latest update time of the received data. In some embodiments, the timestamp may be used as a filtering criteria in satisfying a query constraint value such as freshness. When the received data 316 includes empty stream with an update time, the update time is forwarded onto the data storage 302 via data update 318 to update the timestamp of expected data by matching the query ID field and the query data requested by the originating global query 334. In some embodiments, the received data 316 may be stored in data storage 302 with corresponding child node ID indicating from which child node the data was received. This may permit the current network module 300 to track and monitor the children nodes that may need to be queried for data synchronization, as well as the source of any particular received data 316.

In some embodiments, a data receiving module 316 may receive a partial result sets from a set of children nodes. The received partial results may be stored in data storage 302 and merged with any locally found data in a search result that is sent as data retrieval 312 to the data transmitting module 304 and pushed upstream to its parent node.

The query processing module 308 is configured to receive and process queries including local queries 330 from local applications, global queries 322 received at the current network module 300, and a global query 334 received from a parent node.

When a local query 330 is received by the query processing module 308, the query processing module 308 sends search request 310 to search the data storage 302 for data that satisfies the query constraint value specified in the local query 330. If found, the data may be appended to a search result. Alternatively, the search result may be left as empty (null) or assigned any other value indicating a no data found. The search result is returned to the query processing module 308, which in turn responds to the local application from which the local query 330 was generated with the search results. Thus, the data storage 302, functioning as a materialized view of data in the network 100, permits network module 300 to locally respond to local queries 330.

When a global query 332 is received locally at a network module 300, the query processing module 308 sends search request 310 to search the data storage 302 for data that satisfies the query constraint value specified in the global query 332. If found, the data is appended to a search result, else the search result may be left as empty (or null) or with any other value indicating no data found, and the search result is returned to the query processing module 308. If the query data was found in data storage 302, the query processing module 308 responds to the query with the search result. In the event that no data satisfying the query constraint value was found in data storage 302 (i.e. the search result was null), the query processing module 308 generates one or more child queries 320 configured to be sent to one or more children nodes. The child queries 320 generated by the query processing module 308 are received by children nodes as global queries 334. Each child query 320 (or global query 334 for a child node) may contain a query ID, which may be incorporated into an upstream data transmission 314 from the child node so that the upstream data transmission 314 may be matched with the corresponding child query 320. In some embodiments, the query processing module 308 may determine one or more children nodes that need to queried in order to obtain the query data requested by the child query 320 and generate child queries 320 accordingly.

Figure 4:
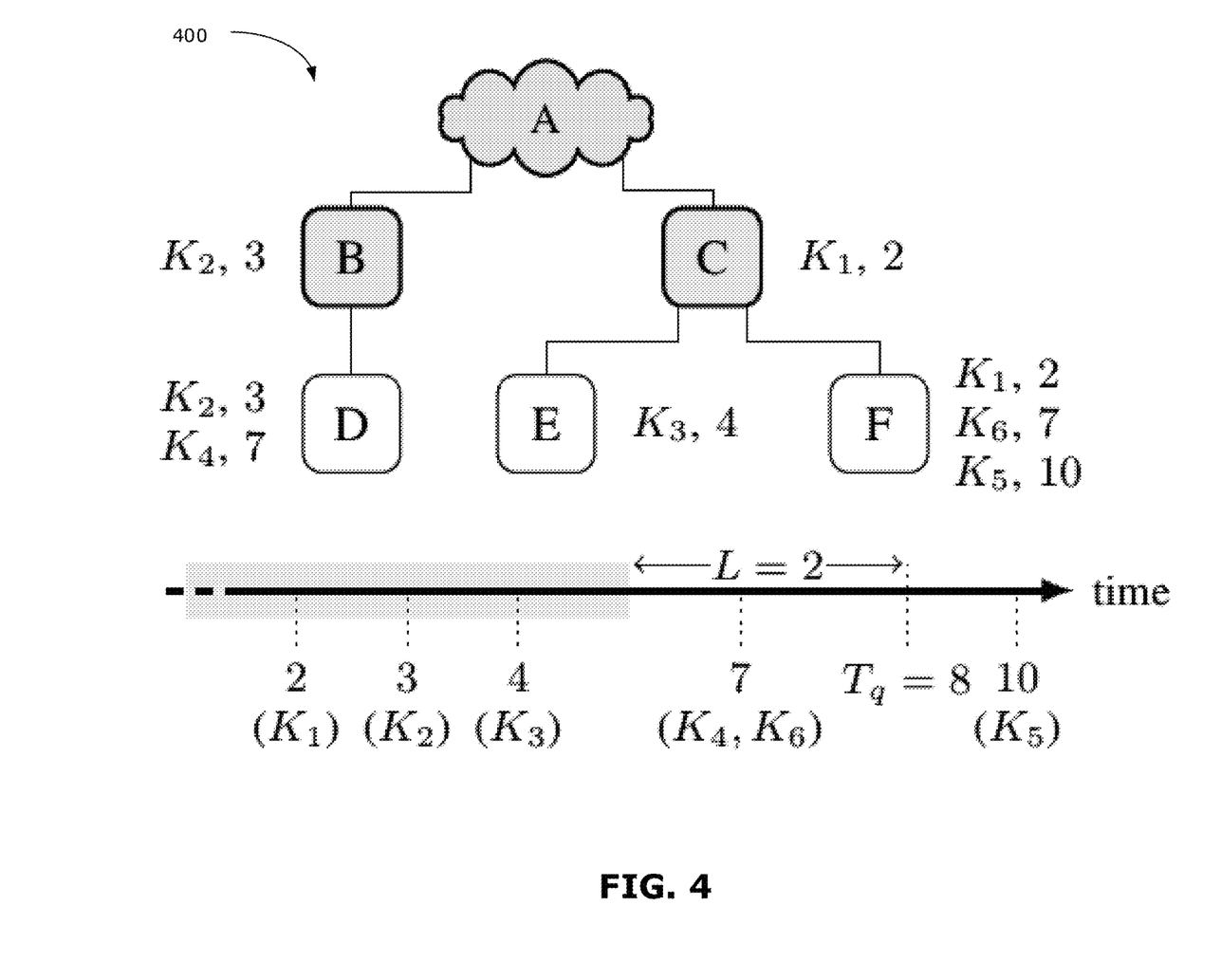
FIG. 4 illustrates a hypothetical edge network in accordance with the present disclosure and a corresponding event timeline.

Thus, when a global query 320 is received by a node in network 100 with a query constraint value such as freshness, the node would execute query on its local storage (the materialized view of the network data), which may provide the query data sought by the query and thereby obviate the need for the time consuming process of querying end nodes. By way of a non-limiting example, in a hypothetical 3-level edge network 400 in accordance with the present disclosure shown in FIG. 4, which may be used to monitor data generating devices such as robotic arms in a factory (not shown) and a timeline showing temporal parameter relationships. In the illustrated embodiments, operational event K, such as power consumption for example, are monitored. As shown in FIG. 4, for a hypothetical global query received at top node A at time T=8 that requests query data having a laxity of L=2, the network must retrieve all data updated before T=6 (i.e. data $K_1$, $K_2$, $K_3$). Since $K_2$ has been synchronized to node B, the network does not need to query node D for the data. Similarly for $K_1$, as it has been synchronized to node C, node F need not be queried. Data $K_3$ may be a "dirty" data that has yet to be synchronized, therefore, node E would need to be queried. Accordingly, rather than visiting all of nodes D, E, F, the network in accordance with the present disclosure may only need to visit nodes B, C, and E to obtained the requested data.

In some embodiments, a node in network 100 may periodically (at regular or irregular time intervals) generate, through query processing module 308, child queries 320 for data synchronization purposes. By requesting data that has yet to be synchronized (i.e. data entry marked as "dirty"), which may be done by specifying a laxity value based on the update times of the nodes, the network 100 may ensure eventual consistency of the network 100.

When a global query 334 (or child query 320) is received from a parent node, whether as part of data synchronization or user generated global query, the query processing module 308 sends search request 310 to search the data storage 302 for data that satisfies the query constraint value specified in the global query 332. If found, the data is appended to a search result, else the search result may be left as empty (or null) or with any other value indicating no data was found. The search result is forwarded onto data transmission module 304, which sends the search results in its entirety or in batches as data transmission 314 back to the parent node from which the global query 334 was received.

Figure 5:
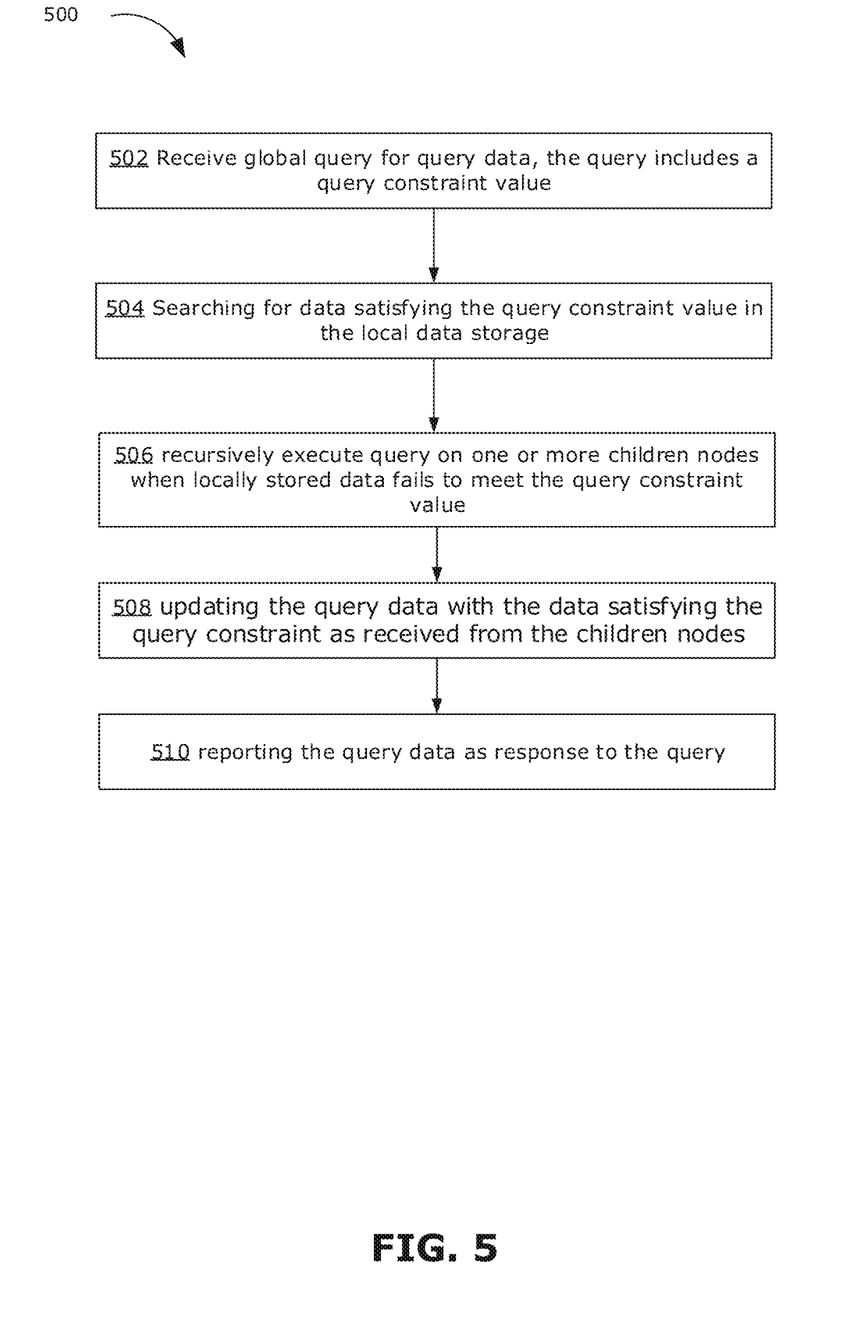
FIG. 5 illustrates a flowchart of an example method that may be performed by the query processing module 308 in FIG. 3 for processing global queries.

FIG. 5 illustrates a flowchart of an example method 500 that may be performed by the query processing module 308 for processing queries.

At 502, a global query 320, or a global query from a parent node 318, is received at a global query processor 308 of a network module 300. The receiving network module 300 may be any of the top node 110 or core nodes 120. The global query 320, 318 includes a user-specified query constraint value, which may specify one or more metadata attributes of the query data or query search parameter.

In some embodiments, the query constraint value may be a temporal accuracy parameter, also referred to as laxity L, of the query data. Laxity L specifies data generated up to a time t requested by the user is to be included in the query data. Effectively, the laxity value loosens or relaxes the freshness requirements on the query data.

Figure 6:
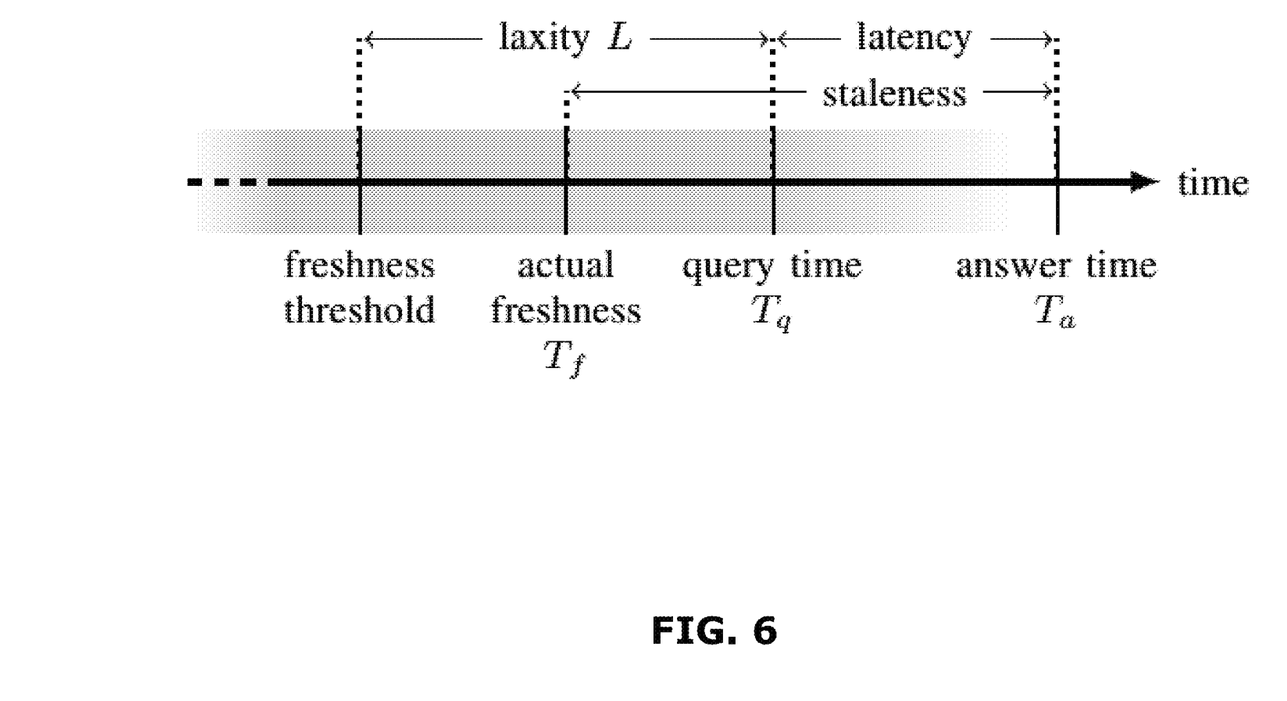
FIG. 6 illustrates a timeline demonstrating the concept of laxity in the present disclosure.

FIG. 6 shows a timeline that better demonstrates the concept of laxity in the present disclosure. As shown, a query time $T_q$ is the time the query, including a laxity value L, was received by a node of the network 100. The network 100 aims to process the query and provide a response containing a set of updated data (i.e. through insertions, deletions, and updates) that occurred before a freshness threshold defined as Tq−L. While laxity may provide a limit on data freshness, query data results can be more fresh than the limit. Thus, the query data may also include an actual freshness time $T_f$ such that all data updated before $T_f$ are included in the query data. Data that were generated after $T_f$, may be included in the result but without guarantee for its inclusion in the result. In some embodiments, the exact value of $T_f$ may depend on which data has already been synchronized within the network 100 (i.e. having the data replicated at parent nodes).

There exists an inherent temporal delay in providing a response as queries take time to execute and propagate between nodes. Accordingly, any query data generated in response to a query may be slightly out of date, even with laxity L=0. In some instances, the actual freshness of data $T_f$ may be older than the query time $T_q$ (i.e. $T_f > T_q$). Hence, a staleness value may be defined as the difference between answer time $T_a$ and the actual freshness time as $T_a - T_f$. As shown in FIG. 6, in some embodiments, network 100 may guarantee the following relationship between the various temporal parameters:

$$T_q - L \le T_f \le T_a$$

To further illustrate the operations of the laxity parameter, reference is made to FIG. 4. As shown, network 400 includes a node A that is a cloud datacenter, nodes B and C are core nodes, and nodes D, E and F are edge nodes. Monitored events $K_1$ to $K_6$ are created by data generating devices (not shown) coupled to the edge nodes D to F, and events such as $K_1$ and $K_2$ have already been respectively replicated to parent nodes C and B. In the example network shown, a global query to retrieve all data is received at $T_q=8$ at node A with a laxity L=2. This provides a freshness threshold of 6 meaning that the network 400 must guarantee that data for events $K_1$, $K_2$, $K_3$, with respective update timestamps of 2, 3, and 4, all prior to the freshness threshold, are included in the query data response. As a result, at least nodes B, C, and E will have to be queried because they all have the data that should be included in the query data response. Node F's last propagation time to C was recent enough such that the required data for event $K_1$ has already been synchronized and locally stored in node C, and therefore node F need not to be queried. If the same global query received time $T_q=8$ has a more permissive laxity L=4.5, it may be sufficient to query only nodes B and C to obtain $K_1$ and $K_2$, as node E no longer needs to be queried since its update time of 4 falls outside of the freshness threshold of 3.5. This results in a faster response time at the expense of staler data.

In some other embodiments, the query constraint value may also be a query response time limit by which the query search is be completed. The query response time limit effectively functions as a latency limit. In such embodiments, a response to a query must be provided within the specified response time limit even if it does not include all the freshest data. The actual freshness time $T_f$ of each data update may be provided to the user to indicate the freshness of the data to the user. In some embodiments, children nodes that fail to respond in time to meet the query response time limit may be treated as failed links as discussed in more detail below. In such embodiments, the child nodes receiving a query from its parent node may decrease the query response time limit to account for latency between parent and child with added headroom for processing. In addition to executing the query, another query is executed on the local data storage of each child node that is tasked with executing the query. For every child node whose response was not received by the query response time limit, the result of the respective local query for such child node is used to update the query data response.

It is to be understood that there may also be more than one query constraint value and any other suitable query constraint values may also be specified.

Referring back to FIG. 5, at step 504, the query receiving node searches in its own local data storage 302 to determine whether data satisfying the query constraint value may be found locally or recursive querying of its children nodes are needed. If the required query data is found within data storage 302 then a query response may be generated more quickly compared to recursively searching through the network nodes. In some embodiments where the query constraint value is laxity L, this decision may depend on the latest update time received from each child c, denoted $T_u(c)$. If one or more $T_u(c)$ is more recent than the freshness threshold $T_q-L$, (i.e. $T_u(c) > T_q - L$) then the locally stored data from the one or more children node is sufficiently recent to generate a response to the query and the need to query its children nodes is obviated.

At step 506, when the data update time $T_u(c)$ of one or more child node c is older than the freshness threshold $T_q-L$, (i.e. $T_u(c) < T_q - L$), then the data pushed by child node c to the query receiving parent node is too stale and the query may be passed onto child node c to be executed. Steps 402 to 404 may be recursively executed (or executed as part of a recursive operation) on each queried child node to return a result to its parent node.

In some embodiments, queries may be executed by nodes in parallel. In such embodiments, queries may be dispatched asynchronously to child nodes, then the local query is executed.

At step 508, upon receipt of response from children nodes tasked with executing the query, the response is appended to the query data as response to the query. In some embodiments, such as where the query constraint value is laxity L, the query receiving node may update the query data to include the actual freshness time $T_f$ of its data. The actual fresh is defined recursively, similarly to the latest update time. In some embodiments, it may be defined as the minimum between the latest update time for the current node and the freshness $T_f$ returned by each of the child node responses. Accordingly, in some embodiments, the actual freshness value $T_f$ may be dependent on the push update period of the children nodes and the depth of the hierarchical network. For example if remote edge nodes need to be queries to obtained the necessary data, then the data propagation time may be more lengthy. Further, if the tiers of the network increases, then the query may need to be executed many times down the network hierarchy increasing processing times, and in turn the freshness of the data returned to the query receiving node.

At 510, the query data may be presented to the user, such as through output device 208, as a response to the query.

Figure 7:
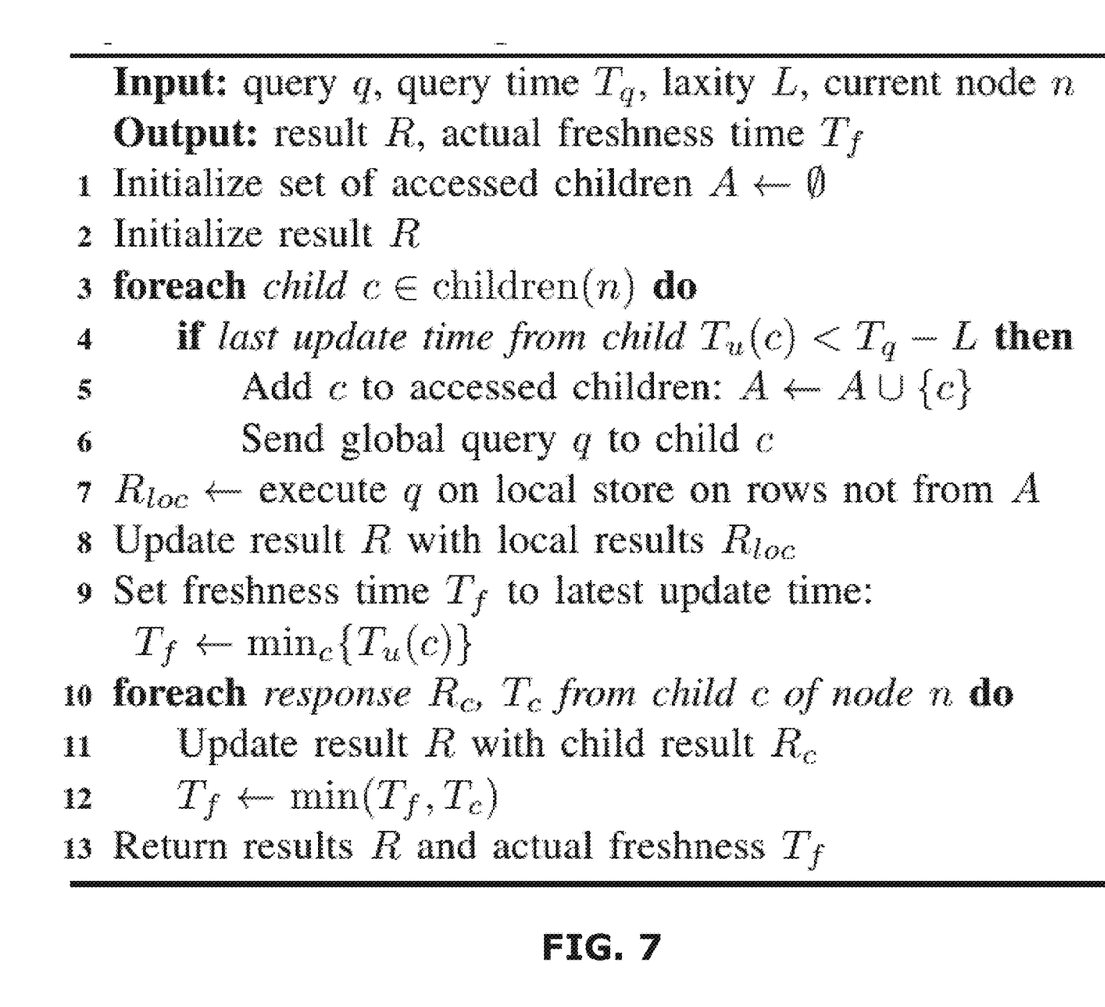
FIG. 7 illustrates an example pseudocode of a global query processing algorithm that may be executed by network module 300 for a query having a query constraint value of laxity L.

FIG. 7 illustrates an example pseudocode of a global query processing algorithm that may be executed by network module 300 where the query constraint value is laxity L. The algorithm accepts query q received at query time $T_q$ along with laxity L and the current node n as inputs, and returns result (i.e. query response data) R with actual freshness time $T_f$. At lines 3 to 6, each child node c of all the children nodes of the current node n are looped through to determine whether the last update from child c is older than freshness threshold $T_q-L$. If so, then child c is added to the list of accessed children and query q is sent to child c asynchronously. The query is executed on the local data storage for data from children nodes with data freshness more recent than the freshness threshold at line 7. Query response R is then incrementally updated with $R_{loc}$, at line 8. At line 9, the freshness time $T_f$ is set as the minimum of between the latest update time for the current node (i.e. $\min_c\{T_u(c)\}$) and the freshness $T_f$ returned by each of the child node responses as found at lines 10 to 12. The query response R and actual freshness $T_f$ are returned as outputs at line 13.

Failures may be common in networks such as a geo-distributed edge network. In particular, since networks are large and intermittent link errors are not uncommon, thus it may be important for such network to be able to execute queries despite lost network connectivity. In some embodiments, queries are permitted to timeout when one or more nodes from which data is required are deemed as unreachable. When network 100 generates search results for a query in the event of a link error for an unreachable node, it may include information about the nodes that were not accessible. When a link to a child node that is to be queried fails or times-out, freshness of data may not be guaranteed for a particular query. In some embodiments, in the event of network failures, network 100 provides a complete but less fresh answer that includes stale results for the missing child node. Specifically, the query response is completed but may not meet the freshness guarantee (i.e. laxity) requested by the user. Rather, the query response may include data with a more relaxed freshness value that depends on the last update time for the child connected by the failing link. In other words, the query response may be guaranteed to be complete for the actual freshness $T_f$, which may be below the freshness threshold: $T_f<T_q-L$. By way of a non-limiting example, a user may request data that with a laxity of 5 minutes (i.e. data that was generated in the last 5 minutes), the network 100 may return a complete query response for the data as of 15 minutes ago. Alternatively, the network 100, in the event of link failures, may provide a partial but up-to-date query response. The query response can fulfill the user-specified freshness guarantee $T_f>T_q-L$, but only with the data from nodes that responded in time without any new data from the sub-tree that cannot be queried due to link failure.

In some embodiments, with each query response, the network 100 provides analytical information that may include, for example, the number of nodes queried, the number of data included in the query response data, and an estimate of amount of data that were not included due to query constraints (i.e. laxity) or link failures.

In some embodiments, each network module 300 may determine the number of children nodes it needs to query for a given query (i.e. lines 3 to 6 in FIG. 7), and the total number of data received from its children node as well as the number of data it obtained from its local data storage.

In some embodiments, each network module 300 tracks the rate of row updates (and insertions) received from each child in order to estimate the number of new or updated data rows. In some embodiments, in addition to recording the last update time, each network module 300 also records the timestamps of the last K+1 updates received from children nodes, and the number of new rows reported on the child.

Hence, the rate of updates from each child node c may be estimated as the mean update rate from the last K updates from node c in accordance with Equation (1):

$$p(c) = \frac{\sum_{i=0}^{k-1} R_i(c)}{T_0(c) - T_k(c)} \qquad \text{Equation (1)}$$

Where $T_0(c)$ is the timestamp of the most recent push update from the child c, and $T_k(c)$ is the timestamp of the oldest push update from the child c, $R_i(c)$ where i=ranges between 0 and k−1, is the number of new data from the child node c that was reported during each of the respective push updates. The estimated number of new or updated in a child c at time $t>T_0(c)$ is therefore $p(c)\cdot(t-T_0(c))$. Within the query data response, the sum of estimates for all children may be included. In some embodiments, where more accurate estimation may be needed, more sophisticated time series prediction approaches can be used. One of such time series prediction method is disclosed in "*Time series prediction using artificial wavelet neural network and multi-resolution analysis: Application to wind speed data*", B. Doucoure, K. Agbossou, and A. Cardenas, Renewable Energy, vol. 92, pp. 202-211, 2016, the disclosure of which is incorporated herein in its entirety.

In some embodiments, there are different types of global queries (referred to as aggregate queries) that may be used determine one or more information (i.e. minimum/maximum value, number of data entry, average, etc.) about the data satisfying the query constraint value or the query data. In some embodiments, aggregate queries in network 100 may adopt the format of Cassandra Query Language (CQL) queries where additional conditions specifying query constraint values, such as data freshness (laxity) or result latency (query response time limit). In such embodiments, the global query may also adopt the features provided by CQL, such as aggregate functions including maximum data value (MAX), minimum data value (MIN), average data value (AVG), total number of data (COUNT), total sum of data satisfying the query constraint value, and total sum of data (SUM) as well as aggregate queries with condition clauses including WHERE to specify specific rows of data to be queried, GROUP BY to condense selected rows of data that share the same values for a set of columns into a single row, ORDER to select the order of the returned results, LIMIT to limits the number of rows returned by a query, and DISTINCT to remove duplications and return distinct data values.

For aggregate queries, instead of updating the query data with the actual data, the query data may be updated based on the type of query. For example, by the data values may be added for a SUM aggregate query. Accordingly, the content and format of the query data may vary depending on the type of aggregate query. For example, for aggregate queries such as MIN, MAX, SUM, COUNT on a network module 300, a single value is provided in the query data response from a child node. For aggregate queries including AVG (average), the query data response may include two values: the average and the number of elements in the set is required to perform the aggregation.

Clauses serve as a condition that is applied to the relevant data prior to aggregation. The aggregation and the clause may be applied to data by the parent node, or the children nodes, or a combination of the two. As an example, for aggregate queries with a GROUP BY clause, the relevant data is first grouped according the GROUP BY condition as an intermediate data, and aggregation is determined for each group of intermediate data by the child node. The results are then pushed upstream to the parent node, which merges results from each group with those from other children nodes. For an aggregate query with a WHERE clause, the clause is applied locally on the data that satisfies the WHERE condition at the child node to derive an intermediate data, which is then sent to parent node for aggregation. For the DISTINCT, ORDER, and LIMIT clauses, the aggregation may be executed at the final layer of aggregation (i.e. the query receiving node) rather than at intermediate nodes.

Although the present disclosure describes methods and processes with action in a certain order, one or more actions of the methods and processes may be omitted or altered as appropriate. One or more actions may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

Further aspects and examples of the present disclosure are presented in the Appendix attached hereto, the entirety of which is hereby incorporated into the present disclosure.

The invention claimed is:

1. A method of data management in a hierarchical edge network, the method comprising:
   receiving a query for a query data at a query receiving node having a plurality of child nodes comprising edge nodes and core nodes, the query including a query constraint value, the edge nodes being operable to aggregate data from one or more data generating devices and the core nodes being operable to aggregate data from a subset of edge nodes, wherein the query constraint value is a temporal accuracy parameter referred to as laxity, denoted L, which defines a freshness threshold for the query data, the freshness threshold defined as $T_q-L$, where $T_q$ is a time at which the query was received;
   searching, in a local data storage of the query receiving node, for data based on the query constraint value;
   updating a search result with data satisfying the query constraint value found in the local data storage;
   responsive to at least a portion of the data satisfying the query constraint value is unavailable in the local data storage of the query receiving node,
      recursively executing the query on one or more of the plurality of child nodes to locate data satisfying the query constraint value;
      updating the search result based on the data satisfying the query constraint value as received from the one or more of the plurality of child nodes; and
      reporting the search result as the query data in response to the query.

2. The method of claim 1, wherein the data satisfying the query constraint value are received from the one or more of the plurality of child nodes in batches.

3. The method of claim 1, wherein the updating includes updating an actual freshness value associated with the data received from the one or more of the plurality of child nodes.

4. The method of claim 3, wherein the actual freshness value is a minimum between a latest update time for the query receiving node and the actual freshness value returned by the one or more of the plurality of child nodes.

5. The method of claim 3, further comprising:
   comparing the actual freshness value of data from each of the plurality of child nodes to a freshness threshold to determine the one or more of the plurality of child nodes that needs to execute the query.

6. The method of claim 1, further comprising:
   responsive to a link error causing a child node of the plurality of child nodes to be an unreachable child node,
      updating the search result with a data from the unreachable child node from the local data storage.

7. The method of claim 1, further comprising:
   responsive to a link error causing a child node of the plurality of child nodes to be an unreachable child node,
      updating the search result with a partial data that satisfies the query constraint value; and
      updating the query data to include the unreachable child node.

8. The method of claim 1, further comprising:
   responsive to a link error causing a child node of the plurality of child nodes to be unreachable,
      estimating a number of missing data; and
      updating the query data to include the number of missing data.

9. The method of claim 8, wherein the estimating includes calculating the number of missing data as:

$$p(c) = \frac{\sum_{i=0}^{k-1} R_i(c)}{T_0(c) - T_k(c)}.$$

10. The method of claim 8, wherein the estimating includes calculating the number of missing data using time series predication.

11. The method of claim 1, further comprising:
receiving updated data from each of the plurality of child nodes;
marking the updated data with an status indicator having a first status value; and
maintaining, in the local data storage, a copy of data received from each of the plurality of child nodes.

12. The method of claim 11, further comprising:
updating the updated data marked with the first status value to a parent node; and
changing the status indicator of the updated data to a second status value.

13. The method of claim 11, wherein the updated data is received from each of the plurality of child nodes periodically.

14. The method of claim 11, wherein the updated data is received from each of the plurality of child nodes upon request.

15. The method of claim 1, wherein the query constraint value is a query response time limit.

16. The method of claim 15, wherein the reporting is completed before the query response time limit.

17. The method of claim 15, further comprising:
responsive to a child node failing to respond before the query response time limit,
updating the query data with a data from the child node failing to respond from the local data storage.

18. The method of claim 15, further comprising:
modifying, by the one or more of the plurality of child nodes, the query response time limit at each hierarchical level to account for latency and processing time of the one or more of the plurality of child nodes.

19. The method of claim 1, wherein the one or more of the plurality of child nodes execute the query in parallel.

20. The method of claim 1, wherein the query is an aggregate query for determining a data information, and updating the search result further comprises:
determining the data information based on the data satisfying the query constraint value; and
updating the query data with the data information.

21. The method of claim 20, wherein the aggregate query includes a condition clause, and the determining further comprises:
applying the condition clause to the data satisfying the query constraint value to determine an intermediate data; and
determining the data information from the intermediate data.

22. The method of claim 20, wherein the data information includes maximum (MAX), minimum (MIN), average (AVG), total number of data (COUNT), and total sum (SUM).

23. The method of claim 21, wherein the condition clause includes WHERE, GROUP BY, ORDER, LIMIT, and DISTINCT.

24. A computing system for data management, the computing system including
a processing device; and
a memory storing instructions which, responsive to execution by the processing device, cause the computing system to:
receive a query for a query data at a query receiving node having a plurality of child nodes, comprising edge nodes and core nodes, the query including a query constraint value, the edge nodes being operable to aggregate data from one or more data generating devices and the core nodes being operable to aggregate data from a subset of edge nodes wherein the query constraint value is a temporal accuracy parameter referred to as laxity, denoted L, which defines a freshness threshold for the query data, the freshness threshold defined as $T_q-L$, where $T_q$ is a time at which the query was received;
search, in a local data storage of the query receiving node, for data based on the query constraint value;
update the query data with data satisfying the query constraint value found in the local data storage;
responsive to at least a portion of the data satisfying the query constraint value being unavailable in the local data storage of the query receiving node,
recursively execute the query on one or more of the plurality of child nodes;
update the query data with the data satisfying the query constraint value as received from the one or more of the plurality of child nodes; and
report the query data as response to the query.

25. A method of data management in a hierarchical edge network, the method comprising:
receiving a query for a query data at a query receiving node having a plurality of child nodes comprising edge nodes and core nodes, the query including a query constraint value, the edge nodes being operable to aggregate data from one or more data generating devices and the core nodes being operable to aggregate data from a subset of edge nodes;
searching, in a local data storage of the query receiving node, for data based on the query constraint value;
updating a search result with data satisfying the query constraint value found in the local data storage, wherein the updating includes updating an actual freshness value associated with the data received from the one or more of the plurality of child nodes, wherein the actual freshness value is a minimum between a latest update time for the query receiving node and the actual freshness value returned by the one or more of the plurality of child nodes;
responsive to at least a portion of the data satisfying the query constraint value is unavailable in the local data storage of the query receiving node,
recursively executing the query on one or more of the plurality of child nodes to locate data satisfying the query constraint value;
updating the search result based on the data satisfying the query constraint value as received from the one or more of the plurality of child nodes; and
reporting the search result as the query data in response to the query.

* * * * *